Patented Apr. 10, 1951

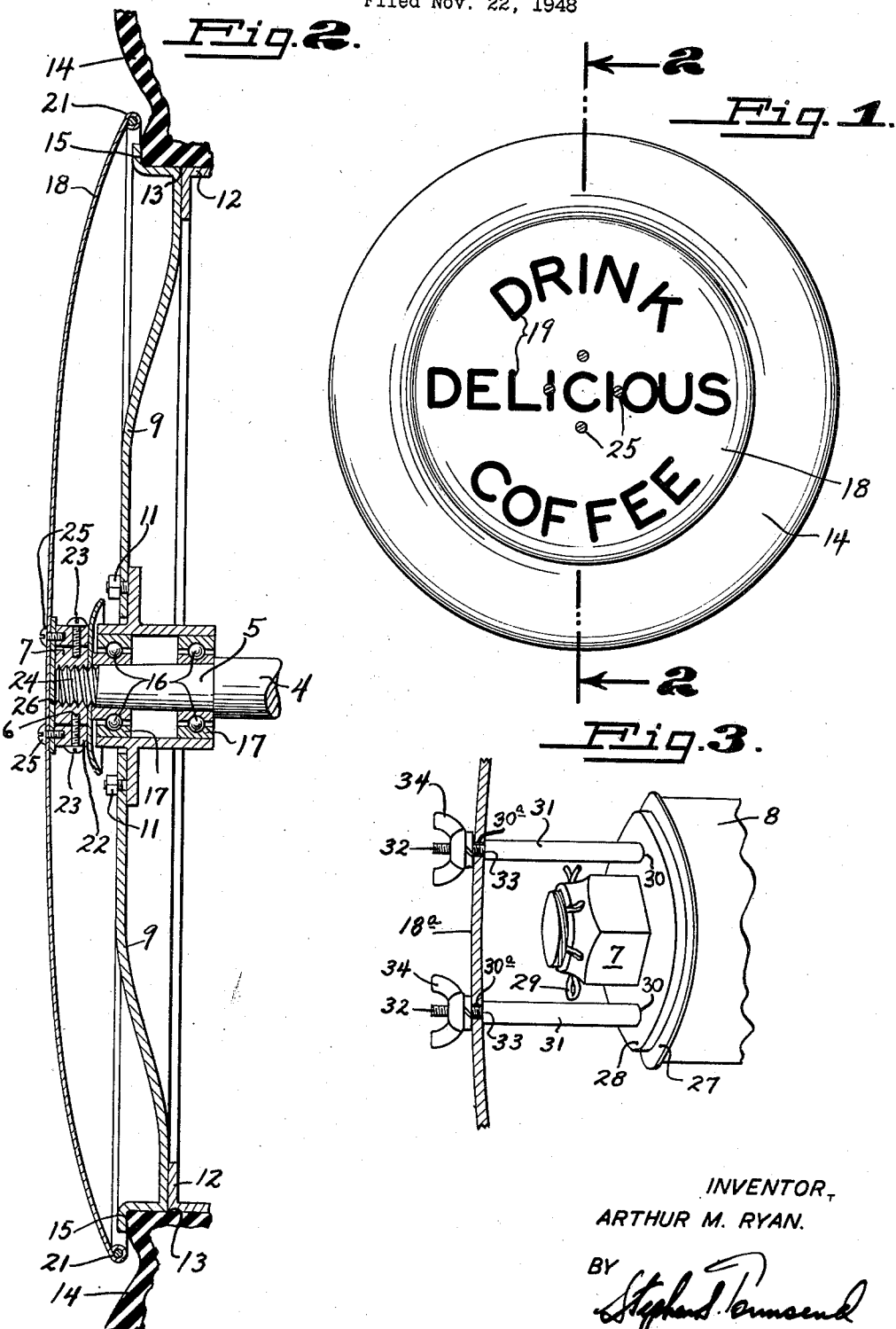

2,548,070

UNITED STATES PATENT OFFICE 2,548,070

ADVERTISING DISPLAY DEVICE

Arthur M. Ryan, Burlingame, Calif.

Application November 22, 1948, Serial No. 61,404

1 Claim. (Cl. 40—129)

This invention relates to an improved advertising display device and more particularly relates to an advertising display device adapted for use on motor vehicles.

The present invention comprises generally a sign carrying member having imprinted on one side thereof media or indicia, which said member is especially adapted for attachment to a non-rotatable axle of a motor vehicle in rotatable relationship with respect to a wheel rotatably mounted on said axle.

A principal object, therefore, of the present invention is to provide an advertising display device for use on motor vehicles of various types, such as trucks, taxicabs, buses or the like.

Another object of the present invention is to provide an advertising display device of the type referred to above which, because of its novel construction and manner of attachment to a non-rotatable axle of a motor vehicle makes it possible to create or accomplish rather striking and unusual visual advertising displays more specifically. As a result of an arrangement of parts, such as heretofore mentioned, the advertising message displayed on the sign carrying member is maintained in a readable position at all times during vehicle movement, and a striking visual effect is created by virtue of the fact that the rotating wheel of the vehicle is concealed from view behind the sign carrying member and the tire on said wheel is made to appear as if it were spinning orbitally around the sign carrying member.

Another object of the present invention is to provide a novel means for removably attaching an advertising display device to a motor vehicle axle whereby a plurality of identically constructed signs carrying various and sundry advertising messages may be readily and rapidly substituted for and interchanged with one another according to advertising needs and desires.

Other objects of the present invention are to provide a novel advertising display device of the type above referred to which may be manufactured inexpensively and in large quantities, and which is of sturdy and rugged construction.

Further objects of the present invention will become apparent upon reading the following specification and referring to the accompanying drawings in which similar characters of reference represent corresponding parts in each of the several views.

In the drawings:

Fig. 1 is a front elevational view of the invention shown operatively attached to an axle and wheel assembly of a motor vehicle.

Fig. 2 is a sectional view taken on line 2—2 of Fig. 1.

Fig. 3 is a fragmentary view in perspective showing a preferred modification of the present invention.

Most conventional type motor vehicles, such as passenger automobiles, taxicabs, trucks, buses or the like, are generally constructed so that it is only the rear wheels and axles of the vehicles that are power driven. On the other hand, the front wheels of conventional motor vehicles are generally rotatably mounted on roller bearings upon non-rotatable front axles of the vehicles.

As has already been indicated, the present invention comprises an advertising display device which is especially adapted for attachment to a non-rotatable axle and, in view, therefore, of present day conventional vehicle design and construction, it is contemplated that the present invention will be most adaptable for use on the front axle and wheel assemblies of such vehicles.

Referring now particularly to Figs. 1 and 2 in the drawings, there is illustrated a more or less conventional front wheel and axle assembly of a conventional type motor vehicle which comprises a front axle 4 having a bearing surface 5 and a threaded outer end 24 that is adapted to receive hexagonal axle nut 7.

The front wheel comprises more specifically a hub 8, a spider 9 attached to the hub by bolts 11, and a U-shaped tire-rim 12 attached to spider 9 by suitable means, such as welding or the like, as at 13. A conventional pneumatic tire is shown only fragmentarily in Fig. 2 and illustrates the approximate manner in which the outwardly projecting tire bead 15 normally engages tire rim 12.

Conventional ballbearings and ballbearing races are illustrated at 16 and 17, respectively, and are disposed between bearing surface 5 of the axle and hub 8 of the wheel to make the wheel freely rotatable with respect to the said axle.

Numeral 18 in the drawings indicates a preferred embodiment of a sign carrying member in the form of a circular disc, concavo-convex in cross-section which may be made from thin metal or plastic or the like, and to which is applied on the outer or convex side thereof advertising media or indicia, such as indicated generally at 19. The particular manner in which the advertising message is impressed or imprinted upon the face of disc 18 forms no part of the present invention, although it is understood, of course, that such media may be directly stamped into the material itself or may be marked thereon by enameling, or by luminous paint for example. The peripheral edge of disc 18 is preferably folded inwardly and doubled back in such manner as to form a bead or casing 21 to provide rigidity to the said disc.

In order to attach removably the circular disc 18 to the hexagonal axle nut 7, an adapter is provided which comprises more specifically a collar 22 having a central hexagonal-shaped aperture of a size and shape appropriate to slide over and to fit around hexagonal axle nut 7. A plurality of set screws, such as indicated at 23, may be employed to clamp or lock the collar 22 securely to axle nut 7, and in order to insure secure engagement by the said set screws 23, a plurality of bores or wells in the sides of the axle nut may be made to receive therein the ends 6 of the said screws. Similarly, a plurality of screws 25 may be employed to attach removably disc 18 to the adapter collar 22. A suitable gasket or washer 26 may be disposed between the disc and adapter to prevent the disc from chattering against either or both the axle nut and/or adapter and to prevent undue vibration of disc 18.

Referring now particularly to Fig. 3 there is illustrated a modification of the manner in which an advertising disc 18ᵃ may be attached to an axle, and which shows a conventional front wheel and axle assembly of a motor vehicle. Between the axle nut 7 and the wheel hub 8 I prefer to insert a felt or metal dust cap or gasket 27 (to prevent entrance of dust or dirt to the bearing races), and a heavy metal washer 28 is also shown against which the hexagonal axle nut 7 normally bears. It is also a common practice to retain the axle nut in tightened position against washer 28 by means of a suitable cotter pin, such as indicated at 29. A conventional axle washer 28 is generally of sufficient thickness to permit threaded bores to be tapped therein which, in turn, are adapted to receive threadedly as at 30 a pair of oppositely disposed projecting adapter bolts 31. Bolts 31 are formed with reduced threaded portions adjacent their projecting ends, as indicated at 32, and by reducing the end portions of bolts 31 in this manner annular shoulders 33 are also formed.

Disc 18ᵃ, as shown in Fig. 3, is formed similarly to disc 18, above described, and is adapted to have displayed thereon an advertising message. Disc 18ᵃ differs from disc 18, only in that the former is provided with a pair of apertures 30ᵃ, which, in turn, are made only slightly larger in diameter than the diameter of the reduced portions 32 of bolts 31. This construction permits the reduced portions 32 of the bolts to be protected through the apertures to thereby support the disc in non-rotatable relationship with the axle and lock nuts 34 may be employed to clamp the disc firmly against shoulders 33 of the bolts.

Preferably each advertising disc (including both the type of disc indicated at 18 and 18ᵃ) should be formed with a diameter slightly larger than the diameter of the tire rim of the wheel, so that the entire wheel and tire rim of a vehicle will be concealed behind the disc, leaving only the tire visible, when the disc is operatively attached to the axle of a vehicle. It is noted that when a disc is attached in one of the ways above suggested that it is affixed in non-rotatable relationship with the axle and in rotatable relationship with respect to the wheel and tire mounted thereon. Furthermore, the disc is mounted concentrically to both the axle and the wheel.

From the foregoing description it becomes apparent that the present invention affords an effective, attractive and inexpensive means of advertising. An advertising disc may be rapidly and readily attached or removed from an axle having one or the other of the types of adapters described herein, and it should further be pointed out that the adapters themselves may be readily attached or removed from an axle of an automobile in the event that a particular occasion makes it undesirable to display any type of advertising media in the above described manner.

Although I have described my invention in some detail by way of illustration for purposes of clarity of understanding, it is understood that certain changes and modifications may be made therein without departing from the spirit of the invention or scope of the appended claim.

I claim:

In combination with an axle assembly of a type comprising an axle, a tire carrying wheel mounted rotatably on said axle and secured thereto by means of an axle nut, an advertising display device comprising; an advertising disc having a circumference slightly larger than the circumference of the tire rim of said wheel, a heavy metal washer mounted on said axle between said axle nut and said wheel, a plurality of substantially straight bolts of equal length affixed to and projecting outwardly from the outer face of said washer in spaced parallel relationship with respect to one another, the outer end of each of the said bolts formed with a reduced threaded portion defining an abutment shoulder, said advertising display disc formed with a plurality of apertures spaced relatively to receive the threaded ends of said bolts, each aperture having a diameter only slightly larger than the reduced threaded end of the bolt which it respectively receives and smaller than the diameter of the shoulder formed by said reduced threaded end, and nuts mounted on the threaded ends of said bolts outwardly of said disc detachably securing said disc to said bolts with the aperture defining portions of the disc clamped securely against the abutment shoulders of said bolts.

ARTHUR M. RYAN.

REFERENCES CITED

The following references are of record in the file of this patent:

UNITED STATES PATENTS

| Number | Name | Date |
|---|---|---|
| 1,522,904 | Pack et al. | Jan. 13, 1925 |
| 2,146,980 | Parks | Feb. 14, 1939 |

FOREIGN PATENTS

| Number | Country | Date |
|---|---|---|
| 281,602 | Great Britain | Feb. 23, 1928 |